United States Patent
Garner et al.

(10) Patent No.: US 12,459,044 B2
(45) Date of Patent: Nov. 4, 2025

(54) WORKHOLDING FOR PULSED ELECTROCHEMICAL MACHINING

(71) Applicant: Rolls-Royce Corporation, Indianapolis, IN (US)

(72) Inventors: Rusty M. Garner, Indianapolis, IN (US); Monica Sy Munoz, Indianapolis, IN (US); Damon Ward, Indianapolis, IN (US); Anthony F. Allen, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 274 days.

(21) Appl. No.: 17/661,246

(22) Filed: Apr. 28, 2022

(65) Prior Publication Data
US 2023/0347435 A1    Nov. 2, 2023

(51) Int. Cl.
 *B23H 11/00* (2006.01)
 *B23H 3/10* (2006.01)
 *B23H 9/10* (2006.01)

(52) U.S. Cl.
 CPC .......... *B23H 11/003* (2013.01); *B23H 3/10* (2013.01); *B23H 9/10* (2013.01); *B23H 2300/10* (2013.01)

(58) Field of Classification Search
 CPC .......... B23H 11/003; B23H 9/10; B23H 3/04; B23Q 3/063; B23Q 3/065
 See application file for complete search history.

(56) References Cited

U.S. PATENT DOCUMENTS

| | | | |
|---|---|---|---|
| 3,386,907 A * | 6/1968 | Abt | B23H 9/14 204/297.05 |
| 3,466,235 A * | 9/1969 | Williams | B23H 3/00 204/228.1 |
| 5,836,075 A * | 11/1998 | Fitzgerald | B23P 15/04 29/889.72 |
| 6,003,754 A | 12/1999 | Rhodes | |
| 6,267,868 B1 | 7/2001 | Wei et al. | |
| 6,334,745 B1 * | 1/2002 | Bennett, Sr. | H05K 3/0044 409/203 |
| 6,627,054 B2 | 9/2003 | Wei et al. | |
| 7,976,694 B2 | 7/2011 | Trimmer et al. | |

(Continued)

FOREIGN PATENT DOCUMENTS

| | | |
|---|---|---|
| AT | 513018 A1 | 12/2013 |
| EP | 2170546 B1 | 3/2014 |
| SU | 1787716 A1 * | 1/1993 |

OTHER PUBLICATIONS

SU-1787716-A1 translation (Year: 1993).*

*Primary Examiner* — Brian W Cohen
(74) *Attorney, Agent, or Firm* — Shumaker & Sieffert, P.A.

(57) ABSTRACT

A pulsed electrochemical machining (pECM) system includes a pECM tool comprising a tool body defining a tool axis, the tool body comprising one or more electrodes, each of the one or more electrodes comprising an electrically conductive material and defining a working surface at a distal end of the tool axis configured to face a workpiece; an enclosure system configured to hold the workpiece, wherein the enclosure system comprises: a first clamp configured to grip a first end of the workpiece; a second clamp configured to grip a second end of the workpiece; and a backside support configured to support a span of the workpiece between the first end and the second end.

19 Claims, 15 Drawing Sheets

(56) References Cited

U.S. PATENT DOCUMENTS

| | | |
|---|---|---|
| 10,060,264 B2 | 8/2018 | Moga et al. |
| 10,436,040 B2 | 10/2019 | Rhodes et al. |
| 2012/0103830 A1* | 5/2012 | Platz ................... B23H 7/26 |
| | | 204/225 |
| 2016/0074952 A1* | 3/2016 | Huttner ................ B23H 7/26 |
| | | 204/224 M |
| 2018/0230833 A1* | 8/2018 | Kush .................. F01D 5/082 |
| 2018/0333795 A1* | 11/2018 | Schmidt ............. B23H 11/003 |
| 2019/0283161 A1* | 9/2019 | Yun ................... B29C 64/245 |
| 2022/0355405 A1* | 11/2022 | Huttner ................ B23H 3/04 |

* cited by examiner

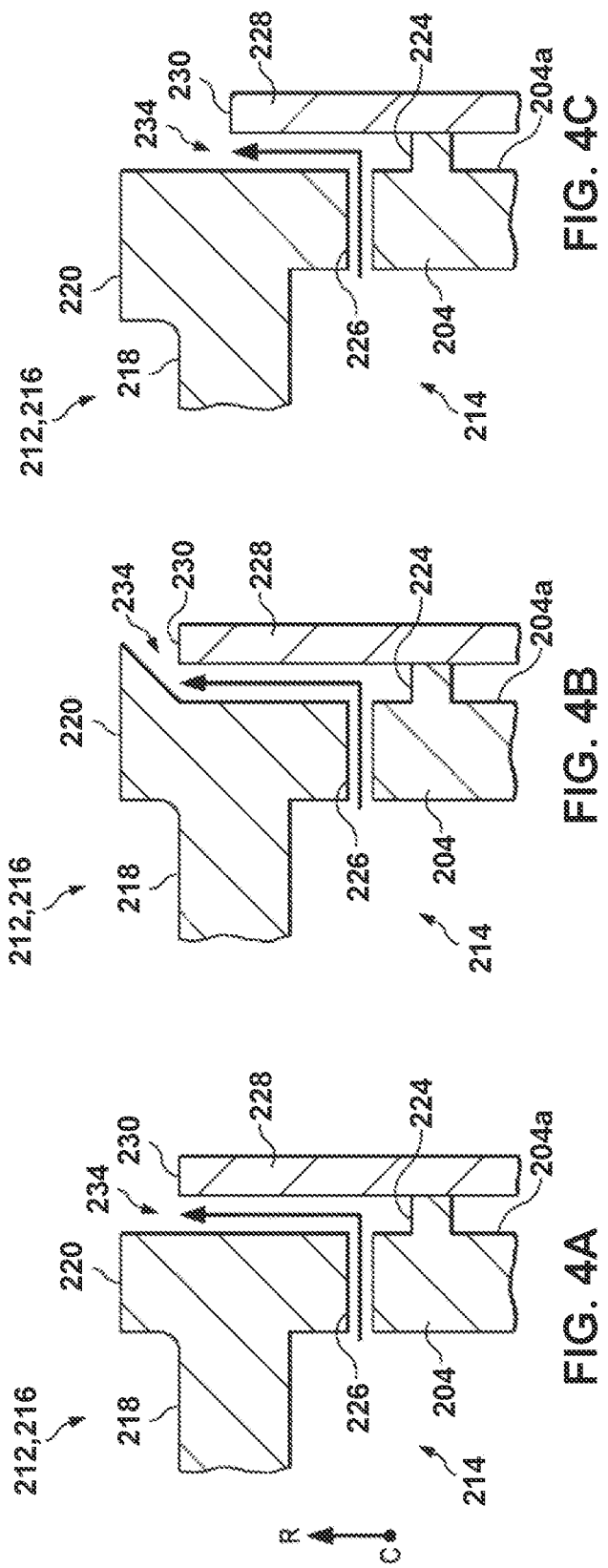

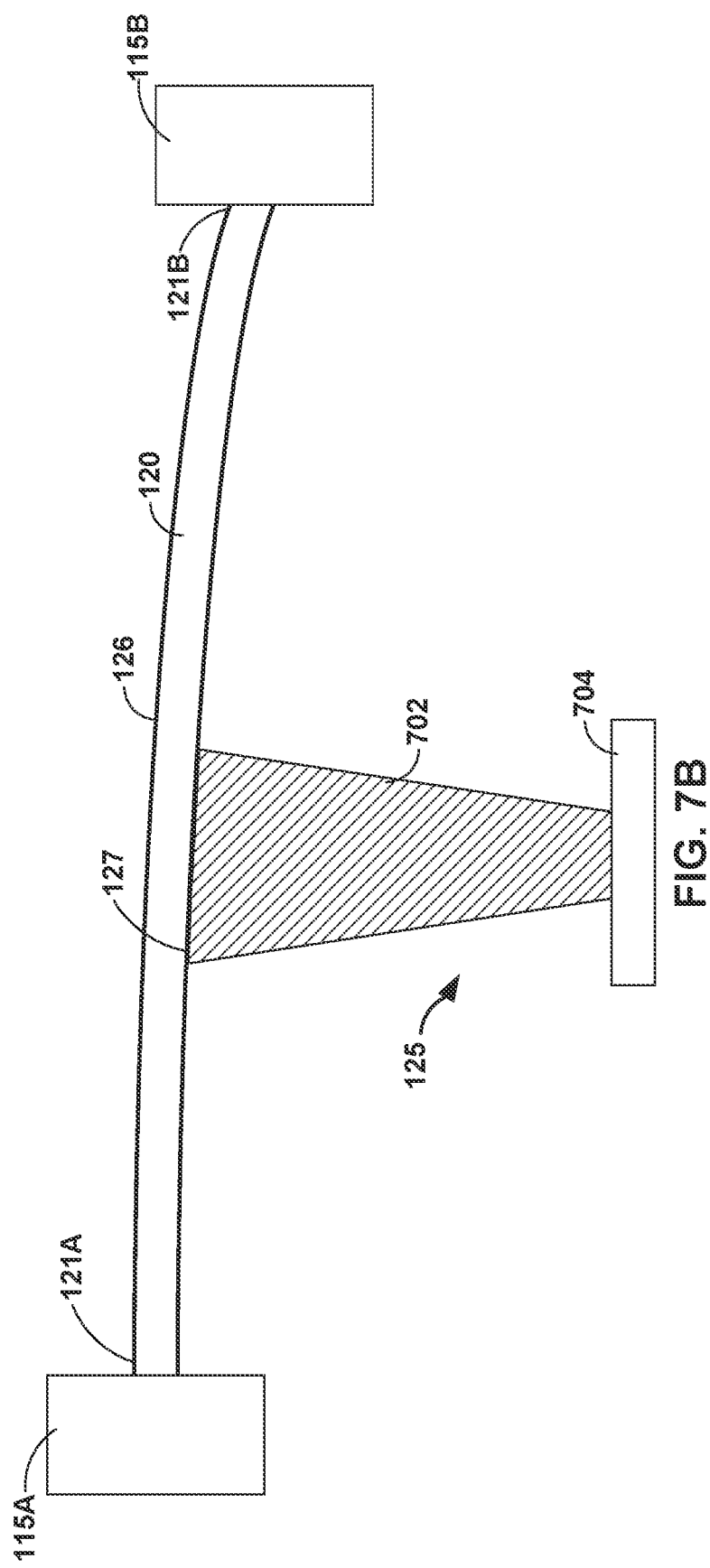

WORKHOLDING FOR PULSED ELECTROCHEMICAL MACHINING

TECHNICAL FIELD

The disclosure relates to pulsed electrochemical machining (pECM).

BACKGROUND

Machining processes may involve removal of material from a workpiece to form a component having a finished shape and texture. Pulsed electrochemical machining (pECM) is a non-contact machining process based on the principles of electrolysis. Pulsed electrochemical machining may also be referred to as precision electrochemical machining or pulse electrochemical machining. A pECM system may include a tool (the cathode) that imparts its shape into a workpiece (the anode) in a mirror image. As the tool moves toward a surface of the workpiece to be machined, a pulsed DC current may be applied to the tool and the workpiece. The tool maintains a tiny interelectrode gap (e.g., of less than about 10 microns) from the surface of the workpiece, and the workpiece dissolves anodically about the tool, taking on the complementary shape of the tool. An electrolyte pumped between the tool and the workpiece may remove dissolved metal, heat and hydrogen from the working gap.

Since the cathodic tool does not physically contact the anodic workpiece, pECM can produce burr-free three-dimensional shapes with little or no tool wear. pECM may be used to machine any conductive metal or alloy, and is particularly well suited for materials, such as superalloys, that are difficult to machine through conventional methods. Materials commonly machined with pECM include, for example, nickel, iron, and titanium-based alloys in a variety of formats such as cast (including single crystal), forged, additively manufactured, and powdered metallurgy.

SUMMARY

In some examples, the disclosure describes a pulsed electrochemical machining (pECM) system that includes a pECM tool comprising a tool body defining a tool axis, the tool body comprising one or more electrodes, each of the one or more electrodes comprising an electrically conductive material and defining a working surface at a distal end of the tool axis configured to face a workpiece; an enclosure system configured to hold the workpiece, wherein the enclosure system comprises: a first clamp configured to grip a first end of the workpiece; a second clamp configured to grip a second end of the workpiece; and a backside support configured to support a span of the workpiece between the first end and the second end.

In some examples, the disclosure describes a pulsed electrochemical machining (pECM) method that includes gripping a first end of the workpiece; gripping a second end of the workpiece; supporting a span of the workpiece that extends between the first end and the second end; generating a pulsed direct current between one or more electrodes of a machining tool and the workpiece, wherein the machining tool comprises a tool body defining a tool axis, the tool body comprising the one or more electrodes, each of the one or more electrodes comprising an electrically conductive material and defining a working surface at a distal end of the tool axis configured to face the workpiece; delivering an electrolyte into an interelectrode gap between the working surface of the one or more electrodes and a target surface of the workpiece; and positioning the working surface of the one or more electrodes relative to the target surface of the workpiece to remove material from the target surface of the workpiece.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A-4C show constant chord-wise cross-sectional views of tip portions having different pressure side rail geometries, in accordance with one or more aspects of this disclosure.

FIGS. 7A-7E are conceptual diagrams illustrating various examples of backside support for a workpiece in a pECM system, in accordance with one or more aspects of this disclosure.

DETAILED DESCRIPTION

The disclosure generally describes techniques and systems for workpiece holding during pECM. In general, the pECM process may impart a force on a workpiece being machined. This force may cause the workpiece to deflect away from the pECM tool, which may reduce accuracy and/or precision of the pECM process. In particular, when using pECM on an airfoil coversheet (described in more detail below) that is clamped at both ends, the force imparted by pECM may cause a span of the coversheet to deflect. In accordance with one or more aspects of this disclosure, a pECM system may include a backside support configured to support a span of a workpiece.

Figure 1A:
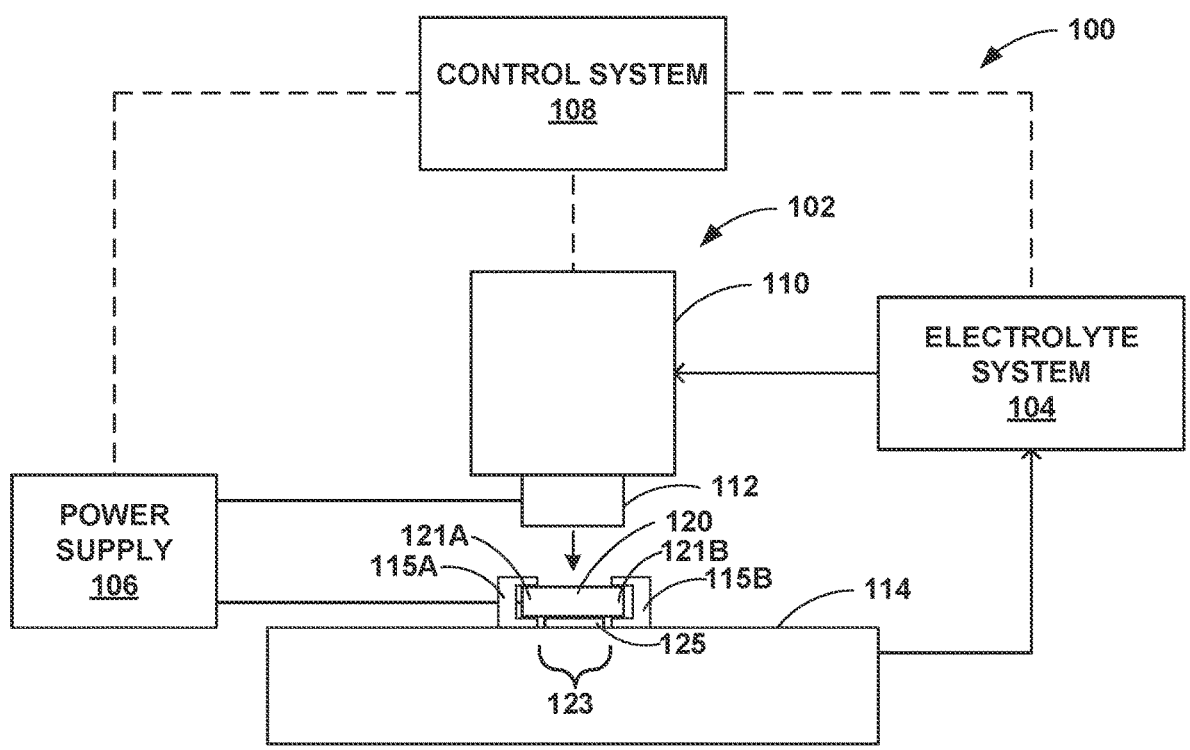
FIG. 1A is a conceptual block diagram illustrating a pulsed electrochemical machining (pECM) system, in accordance with one or more aspects of this disclosure.

FIG. 1A is a schematic conceptual block diagram illustrating an example pulsed electrochemical machining (pECM) system 100 for machining a workpiece 120. pECM system 100 includes a mechanical system 102, an electrolyte system 104, a power supply 106, and a control system 108. While illustrated as separate components, the various components of pECM system 100 may be integrated with other components (e.g., power supply 106 incorporated into mechanical system 102) or overlap with other components (e.g., controllers of mechanical system 102 overlapping with control system 108). While examples of the disclosure are described primarily with regard to pulsed electrochemical machining processes performed by pECM system 100, other examples of the disclosure may be employed using other machining techniques that employ electrochemical machining to shape or otherwise selectively remove material from a workpiece.

Mechanical system 102 may include an actuation system 110, a machining tool 112, and an enclosure system 114. Actuation system 110 may be configured to control a position of machining tool 112 relative to workpiece 120. During a pECM process, actuation system 110 may adjust the position of tool 112 relative to workpiece 120 as needed by moving tool 112, workpiece 120, or both. Actuation system 110 may include one or more actuators, such as direct drive actuators, configured to move tool 112 and/or workpiece 120 as desired during a pECM process. For examples, one or more actuators may be configured to feed or otherwise move machining tool 112 toward workpiece 120 during a pECM process. In some examples, actuation system 110 may be configured to oscillate machining tool 112 (e.g., along the z-axis shown in FIGS. 1B and 1C). Such movement of tool 112 by actuation system may improve removal of dissolved material and restore a concentration of electrolyte between machining tool 112 and workpiece 120. As illustrated in the example of FIG. 1A, mechanical system 102 may be configured to receive electrolyte from electrolyte system 104 and discharge the electrolyte to or proximate to machining tool 112.

Machining tool 112 may be configured to mechanically couple to actuation system 110 and electrically couple to power supply 106. For example, machining tool 112 may include one or more structures or assemblies to couple to actuation system 110, such that machining tool 112 receives a control force for positioning machining tool 112, electrolyte (if distributed via mechanical system 102) for discharging from machining tool 112, and electrical current for generating an electric potential between machining tool 112 and workpiece 120. As will be described further in FIGS. 1B and 1C below, machining tool 112 may be configured to define a working surface that, in combination with workpiece 120 and the electrolyte supplied by electrolyte system 104, forms an electrolytic cell that dissolves material from the outer surface of workpiece 120 using electrolysis.

Enclosure system 114 may be configured to mount workpiece 120 and electrically couple workpiece 120 to power supply 106 for generating a voltage between machining tool 112 and workpiece 120 (e.g., in the form of a pulsed direct current). For example, enclosure system 114 may position workpiece 120 toward machining tool 112, such that a working surface of workpiece 120 is exposed to a working surface of machining tool 112. In some examples, enclosure system 114 may capture spent electrolyte from workpiece 120 for return to electrolyte system 104. In some examples, enclosure system 114 may include one or more mechanical components configured to grip/hold workpiece 120 during the pECM process). For instance, enclosure system 114 may include clamps 115A and 115B (e.g., vices). As shown in the example of FIG. 1A, clamp 115A may grip first end 121A of workpiece 120 and clamp 115B may grip second end 121B of workpiece 120. While illustrated as including two clamps, enclosure system 114 may include a single clamp or more than two clamps. For instance, enclosure system 114 may omit clamp 115B and workpiece 120 may be cantilevered from clamp 115A. In accordance with one or more aspects of this disclosure and as discussed in more detail below, enclosure system 114 may include backside support 125, which may be configured to support at least a portion of span 123 of workpiece 120. For clarity, clamps 115A and 115B, along with backside support 125, are not shown in FIG. 1B.

Electrolyte system 104 may be configured to condition and circulate electrolyte (e.g., liquid electrolyte) for distribution to a working surface of machining tool 112, such as via mechanical system 102. Electrolyte system 104 may include one or more pumps configured to discharge the electrolyte to mechanical system 102, one or more filters configured to filter contaminants from the electrolyte (e.g., for the re-use of electrolyte in the pECM process), one or more heat exchangers configured to remove heat from the electrolyte, and/or other components configured to maintain various parameters of the electrolyte.

Power supply 106 may be configured to generate an electric potential between machining tool 112 and workpiece 120. For example, power supply 106 may be configured to apply a voltage between machining tool 112 and workpiece 120 to generate current flow between machining tool 112 and workpiece 120 with the electrolyte flowing or otherwise present between machining tool 112 and workpiece 120. For a pulsed ECM process, power supply 106 may be configured to supply voltage in pulses, such as in combination with oscillations of machining tool 112 relative workpiece 120, to increase local current density. For example, power supply 106 may include a direct current (DC) source that applies a pulsed direct current to both machining tool 112 and workpiece 120 during the pulse electrochemical machining process. In some examples, actuation system 110 may oscillate the position of machining tool 112 relative workpiece 120 in coordination with the pulsed direct current.

Control system 108 may be communicatively coupled to mechanical system 102, electrolyte system 104, and power supply 106, and configured to send control signals to mechanical system 102, electrolyte system 104, and power supply 106. For example, the control signals may cause mechanical system 102 to control (e.g., dynamically) a position of machining tool 112 relative to workpiece 120, cause electrolyte system 104 to supply electrolyte between machining tool 112 and workpiece 120, and cause power supply 106 to generate an electric potential between machining tool 112 and workpiece 120. Further operation of control system 108 will be described in FIG. 1D below.

Figure 1B:
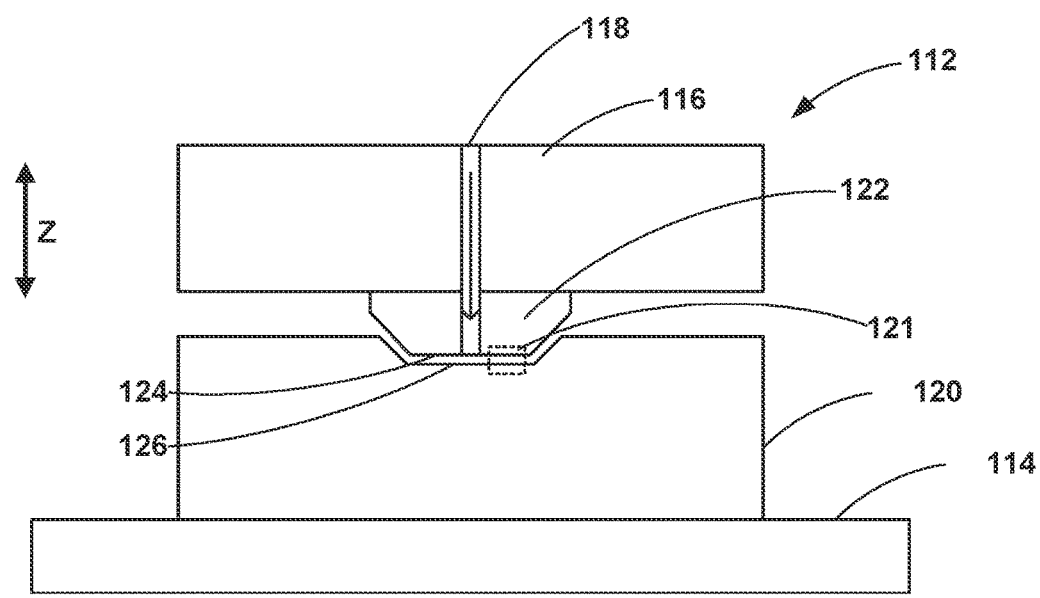
FIG. 1B is a side view cross-sectional conceptual diagram illustrating operation of a pECM tool of the pECM system of FIG. 1A, in accordance with one or more aspects of this disclosure.

Machining tool 112 defines a working surface that forms workpiece 120 into a component having a particular shape or set of dimensions (e.g., approximately the complimentary shape of machining tool 112). FIG. 1B is a side view cross-sectional conceptual diagram illustrating operation of machining tool 112 of pECM system 100 of FIG. 1A. Machining tool 112 includes a tool body 116 defining a tool axis that aligns with an axis of actuation system 110 of FIG. 1A. Tool body 116 includes one or more electrodes 122 (one or more cathodes). While illustrated in FIG. 1B as including a single electrode 122, tool body 116 may include multiple electrodes 122. Each electrode 122 defines a working surface 124 at a distal end of the tool axis. When machining tool 112 is attached to actuation system 110, each working surface 124 is configured to face a corresponding target surface 126 of workpiece 120. In some examples, such as illustrated in FIG. 1B, tool body 116 may include an electrolyte channel 118 configured to receive an electrolyte from electrolyte system 104 (e.g., via mechanical system 102) and discharge the electrolyte through one or more openings near working surface 124 of electrode 122.

Each electrode 122 includes an electrically conductive material at working surface 124. Likewise, workpiece 120 may be an electrically conductive material. When an electric potential (e.g., in the form of a pulse direct current) is generated between working surface 124 of electrode 122 and target surface 126 of workpiece 120 (e.g., with power supply under the control of control system 108), working surface 124 may form a cathode surface and target surface 126 may form an anode surface. As working surface 124 is advanced and material from workpiece 120 is removed, a shape of target surface 126 may generally correspond to the complimentary shape of working surface 124. While the shape of workpiece 120 is shown to mirror the shape of electrode 122 in FIG. 1B, in other examples, the dimensions and shape formed in workpiece 120 from the removal of material from workpiece 120 do not exactly mirror the shape of the tool 112.

The conductive materials of electrode(s) 122 and workpiece 120 may be any suitable conductive material such as metal, metal alloy, or ceramic material. Examples of metals that may be used to form the workpiece 120 and the electrode(s) 122 of tool 112 include nickel, iron, and titanium-based alloys in a variety of formats such as cast (including single crystal), forged, additively manufactured, and powdered metallurgy. Examples of suitable metals and metal alloys for the workpiece 120 and electrode(s) 122 of tool 112 include, but are not limited to, any superalloy such as CMSX-4, MarM247, Haynes 230, Rene N-5, MP35N, and the like, steels such as 4140, A2 tool steel, M4 tool steel, and gear steels such as Ferrium C64, Al 6061, Al 7075, brass, bronze, CoCr, Cu, Ge, Inconels such as 625, 718, and 740h, Mo, Ni, Nitinol, Nitronic 60, Pyrowear 53, stainless steels such as 17-4, 304, 316, and 440C, Ti Grade 1-5, Ti 64, TiAl, and mixtures and combinations thereof.

Figure 1C:
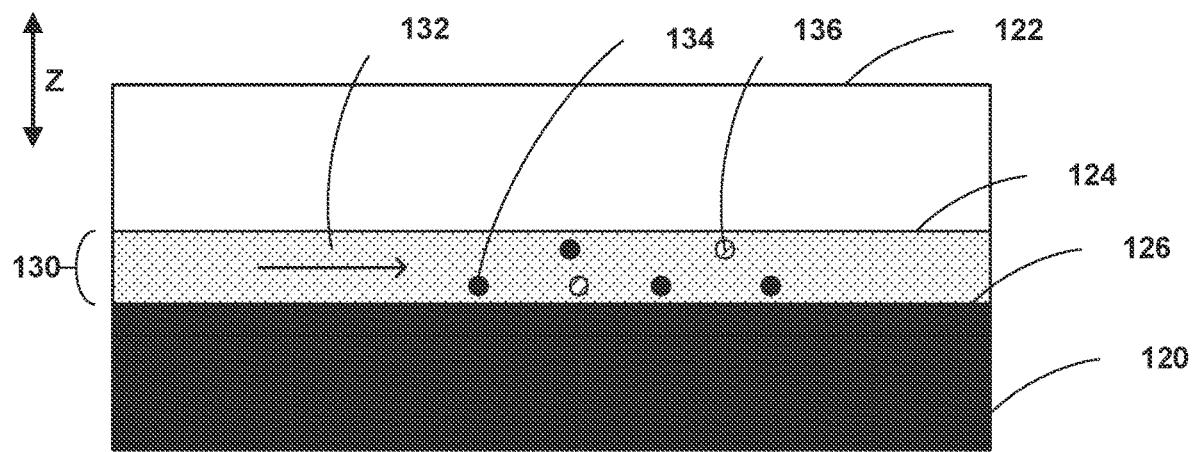
FIG. 1C is a side view cross-sectional conceptual diagram illustrating a magnified view of a portion of FIG. 1B, in accordance with one or more aspects of this disclosure.

FIG. 1C is a side view cross-sectional conceptual diagram showing a magnified view within window 121 indicated in FIG. 1B to illustrate operating principles of the pECM tool of FIG. 1B. Working surface 124 of electrode 122 is positioned relative to target surface 126 of workpiece 120 to form an interelectrode gap 130, and an electrolyte 132 flows through interelectrode gap 130. When an electric potential (e.g., in the form of a pulse direct current) is generated between working surface 124 and target surface 126, current flows from working surface 124 to target surface 126 via electrolyte 132 to form an electrolytic cell. The current dissolves material at target surface 126 to generate electrochemical reaction products that include dissolved material 134, hydrogen gas 136, and heat. Electrolyte 132 carries away the electrochemical reaction products from interelectrode gap 130. In general, material removal rate may be related to current density in interelectrode gap 130. The current density in interelectrode gap 130 may be related to a variety of parameters including, but not limited to: spatial parameters, such as a distance of interelectrode gap 130; electrical parameters, such as an electric potential across interelectrode gap 130; electrolyte parameters, such as a flow rate of electrolyte 132; and other parameters that may affect flow of current from working surface 124 to target surface 126.

Figure 1D:
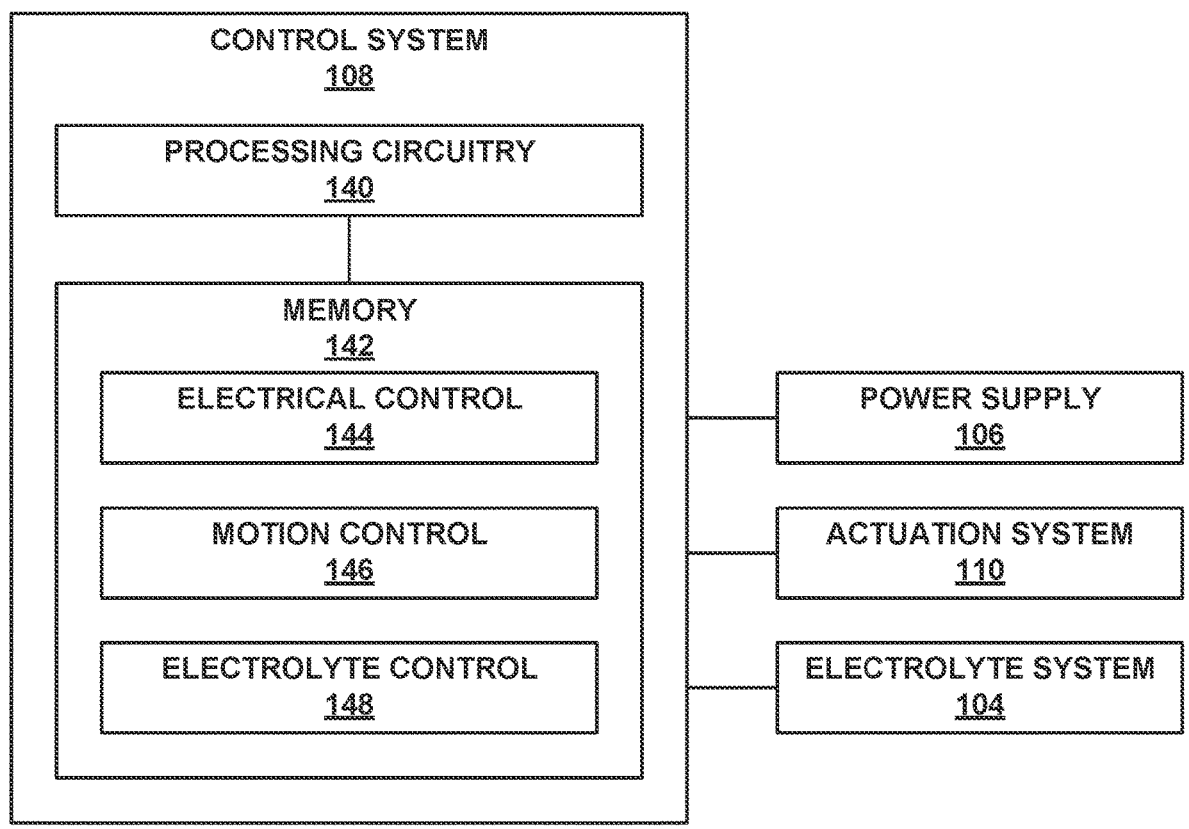
FIG. 1D is a conceptual block diagram illustrating an example control system of the pECM system of FIG. 1A, in accordance with one or more aspects of this disclosure.

FIG. 1D is a conceptual block diagram illustrating an example control system 108 of pECM system 100 of FIG. 1A. Control system 108 includes processing circuitry 140 and a memory 142. Memory 142 includes computer-readable instructions that, when executed by processing circuitry 140, causes processing circuitry 140 to perform various functions related to control of components of pECM system 100. Processing circuitry 140 may include any one or more microprocessors, controllers, digital signal processors (DSPs), application specific integrated circuits (ASICs), field-programmable gate arrays (FPGAs), or equivalent discrete or integrated digital or analog logic circuitry, and the functions attributed to processing circuitry 140 herein may be embodied as software, firmware, hardware or any combination thereof. Memory 142 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Memory 142 may store any suitable information, including information for executing one or more electrochemical machining processes with which pECM system 100 performs on workpiece 120. For example, memory 142 may store one or more of electrical control instructions 144, motion control instructions 146, and electrolyte control instruction 148 in separate memories within memory 142 or separate areas within memory 142. Electrical control 144, motion control 146, and electrolyte control 148 may, in combination, define parameters that control pECM system 100 to remove material from workpiece 120 to generate a component having particular dimensions. In some examples, workpiece 120 may be a partially fabricated component having relatively rough dimensions, such that the pECM process may further refine workpiece 120 to relatively fine dimensions.

Electrical control 144 may define values for electrical parameters of a pECM process including, but not limited to, voltage amplitude applied to electrode 122 and workpiece 120, frequency of electric current, duty cycle (e.g., pulse length), current amplitude, and other electric parameters associated with control of current across interelectrode gap 130. Processing circuitry 140 may generate and send control signals that include the electrical parameters to electrical control circuitry of power supply 106.

Motion control 146 may define values for motion parameters of a pECM process including, but not limited to, feed rate of machining tool 112, position of machining tool 112 (e.g., depth limit of machining tool 112), frequency of oscillation of machining tool 112, amplitude of oscillation of machining tool 112, length of interelectrode gap 130, and other motion parameters associated with control of relative and/or time-varying position of working surface 124. Processing circuitry 140 may generate and send control signals that include the motion parameters to actuation circuitry of actuation system 110.

Electrolyte control 148 may define values for electrolyte parameters of a pECM process including, but not limited to, flow rate of electrolyte 132 through interelectrode gap 130, temperature of electrolyte 132, and other electrolyte parameters associated with conditions of electrolyte 132 in interelectrode gap 130. Processing circuitry 140 may generate and send control signals that include the electrolyte parameters to electrolyte control circuitry of electrolyte system 104.

Figure 1E:
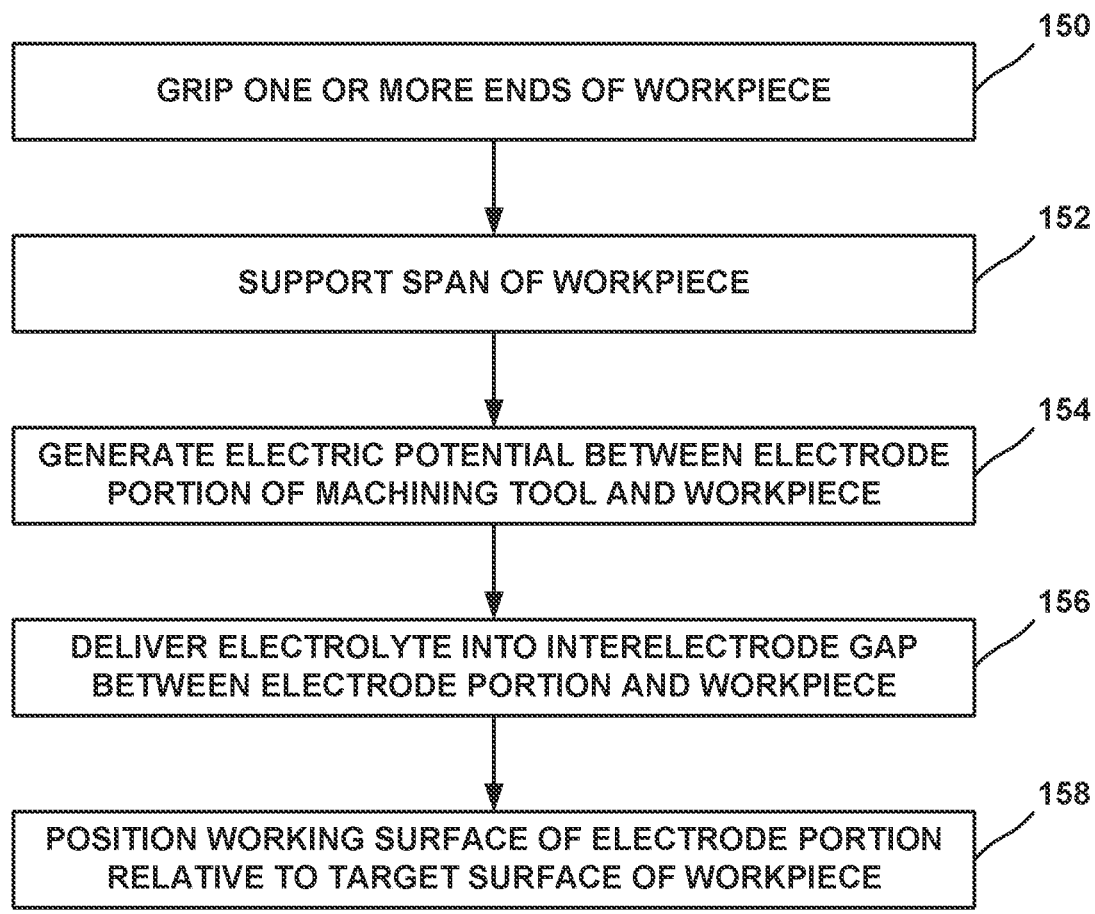
FIG. 1E is a flow diagram illustrating an example technique for controlling the pECM system of FIG. 1A, in accordance with one or more aspects of this disclosure.

FIG. 1E is a flow diagram illustrating an example technique for controlling pECM system 100 of FIG. 1A. While illustrated sequentially, the various steps of FIG. 1E may be initiated in a different order (or sequentially) to remove material from workpiece 120. Enclosure system 114 may grip one or more ends of workpiece 120 (150). For instance, clamp 115A may grip first end 121A of workpiece 120 and/or clamp 115B may grip second end 121B of workpiece 120. Enclosure system 114 may support a span of workpiece 120 (152). For instance, backside support 125 may support at least a portion of span 123 of workpiece 120. Control system 108 may cause power supply 106 to generate an electric potential between electrode 122 and workpiece 120 (154) and cause electrolyte system 104 to deliver electrolyte 132 into interelectrode gap 130 between working surface 124 of electrode 122 and target surface 126 of workpiece 120 (156) to form an electrolytic cell. Control system 108 may cause actuation system 110 to position working surface 124 of electrode 122 relative to target surface 126 of workpiece 120 (158) to control the size of interelectrode gap 130 and advance working surface 124 toward target surface 126 as material is removed from workpiece 120. In some examples, interelectrode gap 130 may be on the order of about 10 microns although other values are contemplated.

Figure 2:
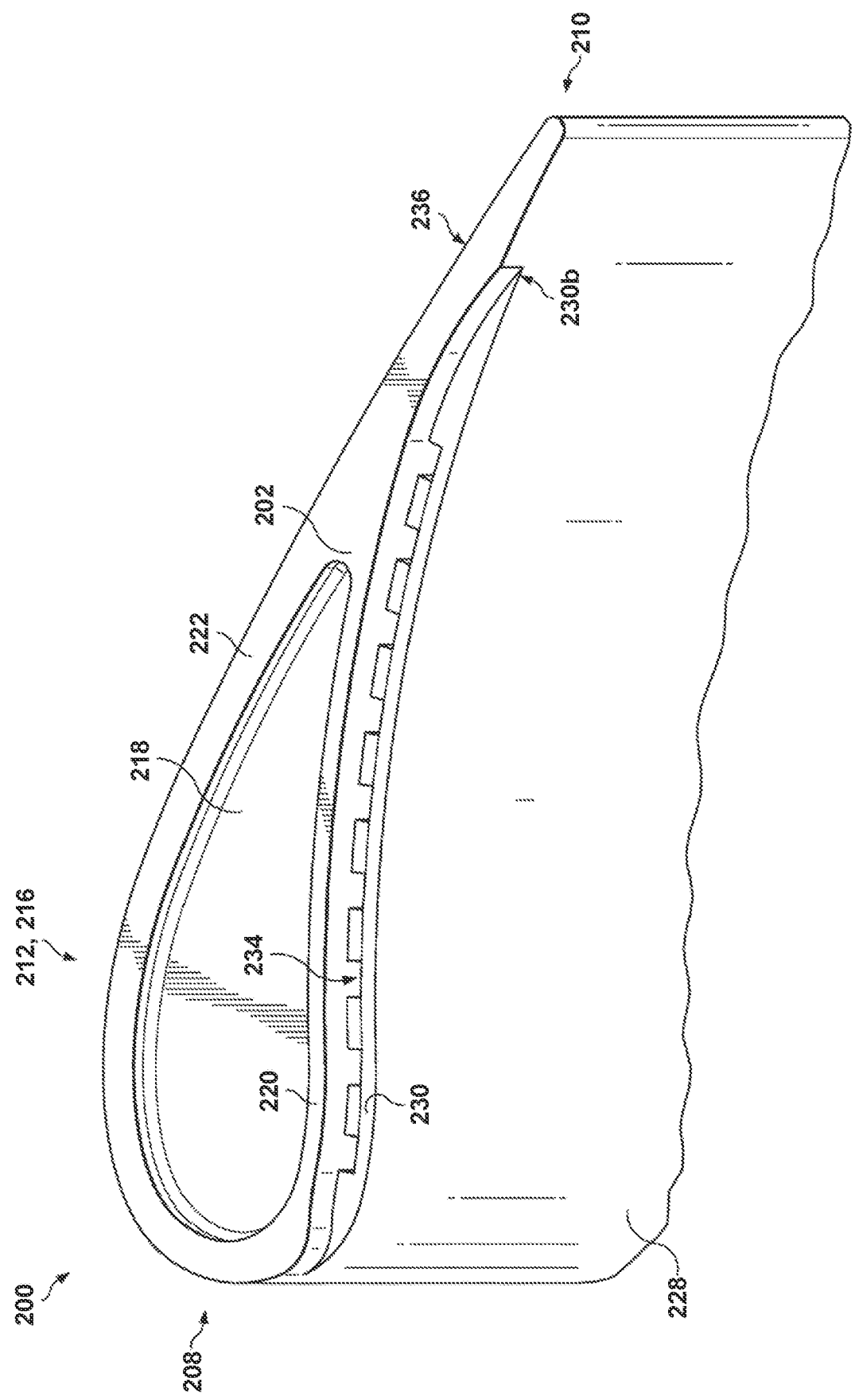
FIG. 2 shows a cut away view of an exemplary tip portion of an airfoil with dual wall cooling structure for a gas turbine engine, in accordance with one or more aspects of this disclosure.
Figure 3:
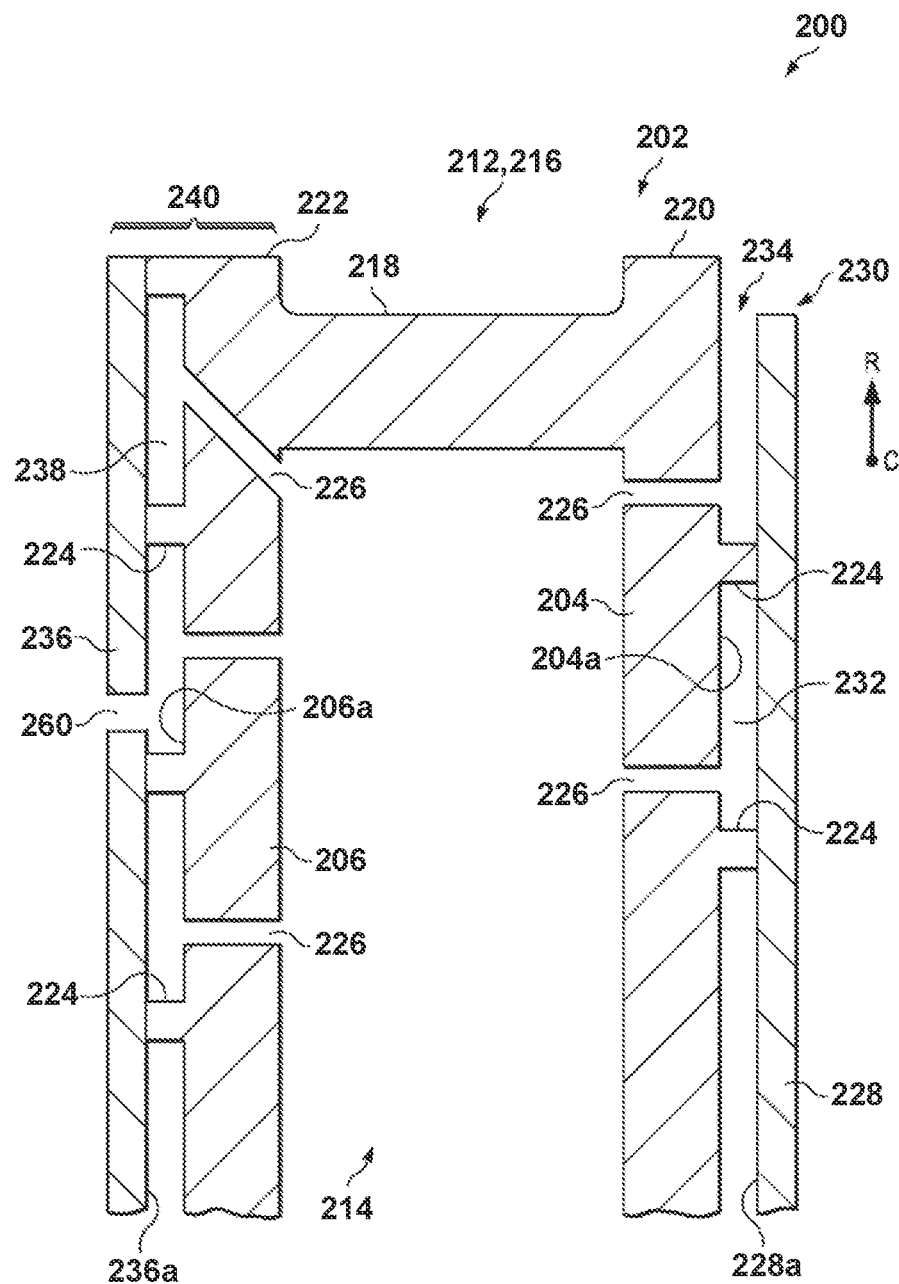
FIG. 3 shows a constant chord-wise cross-sectional view of the exemplary tip portion of FIG. 2, in accordance with one or more aspects of this disclosure.

FIG. 2 shows a cut away view of an exemplary tip portion of an airfoil with dual wall cooling for a gas turbine engine, and FIG. 3 shows a cross-sectional view of the tip portion. The airfoil 200 includes a spar 202 having a pressure side wall 204 and a suction side wall 206 meeting at a leading edge 208 and at a trailing edge 210 of the airfoil. A tip 212 extends between the pressure and suction side walls 204, 206, and an interior of the spar 202 includes a coolant cavity 214. In this example, the tip 212 is a squealer tip 216 including a radially-recessed surface cavity 218 bounded by the pressure side wall 204 and the suction side wall 206. The portion of the pressure side wall 204 extending radially beyond the surface cavity 218 may be referred to as a pressure side rail 220, and the portion of the suction side wall 206 extending radially beyond the surface cavity 218 may be referred to as a suction side rail 222. Each of the pressure side wall 204 and the suction side wall 206 includes an arrangement of pedestals 224 on an outer surface 204 a, 206 a thereof and a plurality of cooling holes 226 in fluid communication with the coolant cavity 214.

A pressure side coversheet 228 overlies the pressure side wall 204 and terminates in a radial direction short of the tip 212, 216 of the spar 202 to form a shelf 230 extending along a chordal direction. An inner surface 228a of the pressure side coversheet 228 is in contact with the arrangement of pedestals 224 so as to define a flow pathway (or flow channels) 232 between the pressure side wall 204 and the pressure side coversheet 228. Consequently, coolant emerging from the cooling holes 226 impinges on the inner surface 228a of the coversheet 228 and follows the flow pathway 232 determined by the arrangement of pedestals 224 on the spar 202. The flow channels 232 are configured to direct coolant from the cooling holes 226 to radial flow outlets 234 adjacent to the shelf 230. When the term "radial" is used as a modifier for "flow outlets" or "coolant outlets," the outlets may be understood to be radially directed or radially aligned in the direction of the tip, where the radial direction R is shown in FIG. 3. The shelf 230 may extend in the chordal (or chord-wise) direction C, also shown in FIG. 3, from at or near the leading edge 208 to a pressure-side location 230b short of the trailing edge 210. In other words, the shelf 230 may extend from at or near the stagnation point 208, where the mainstream flow velocity is zero, to the pressure-side location 230b.

As can be seen from the constant chord-wise cross-sectional views of FIGS. 4A-4C, coolant may be ejected from the radial flow outlets 234 in a radial direction toward the tip 212,216, thereby effectively cooling the tip. The radial direction may be understood to be substantially parallel to the outer surface 204a of the pressure side wall 204. In addition to the radial flow outlets 234, coolant may be ejected from the flow channels 232 through additional holes in the pressure side coversheet 228.

It should be noted that when a structure (e.g., shelf 230, pressure side rail 220, suction side rail 222, etc.) is described as being disposed "near the [position]" or "short of the [position]," where [position] may be substituted with leading edge, trailing edge, or another location, it may be understood that the structure is disposed a distance d or less from the [position], where the distance d is equal to 20% of the total length from the leading edge 208 to the trailing edge 210, as measured along a centerline of the tip 212.

As shown in FIGS. 4B and 4C, the pressure side rail 220, which is adjacent to the radially-recessed surface cavity 218, may have an increased thickness compared to the portion of the pressure side wall 204 that lies adjacent to the coolant cavity 214. In one example, the pressure side rail 220 may flare outward, as shown in FIG. 4B, thereby increasing in thickness along the radial direction. In another example shown in FIG. 4C, the increased thickness may be due to the incorporation of additional material on an inner surface (i.e., the surface facing the surface cavity 218) of the pressure side rail 220. Such configurations may be beneficial to provide additional surface area on the rail 220 for abrasive coating applications.

Figure 5A:
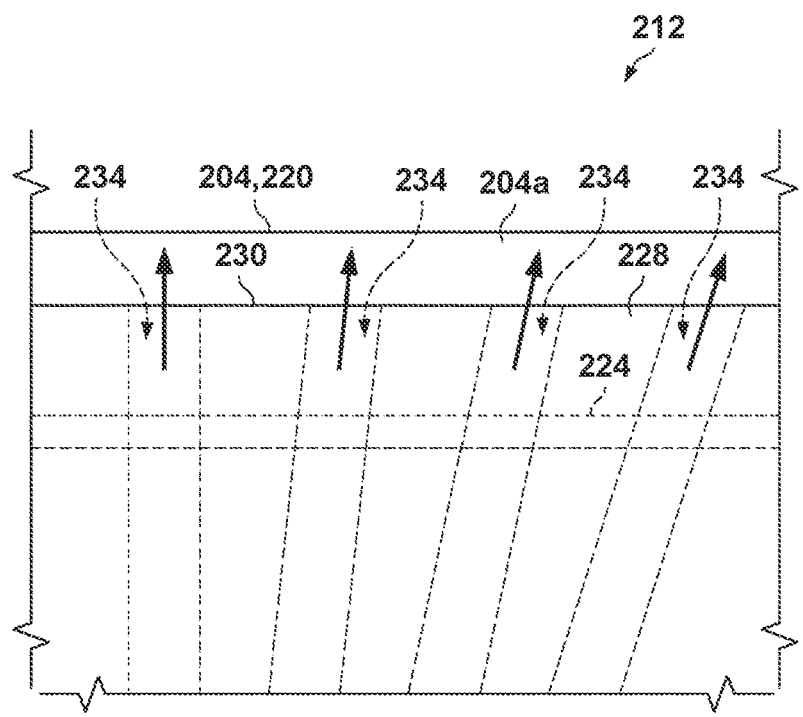
FIG. 5A shows a view of an exemplary tip portion normal to the pressure side wall according to one example, where coolant exits pressure side flow channels through one or more slanted radial flow outlets, in accordance with one or more aspects of this disclosure.
Figure 5B:
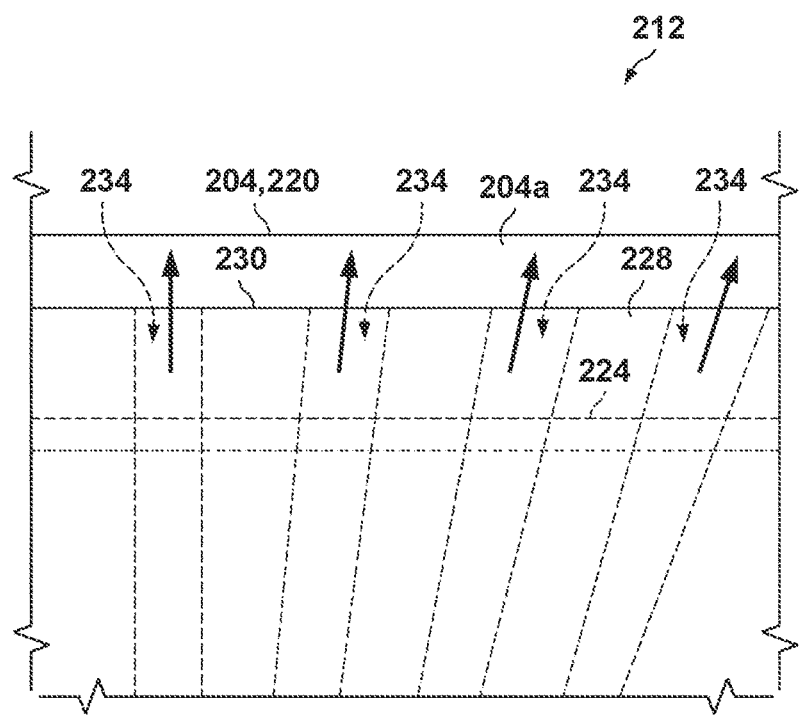
FIG. 5B shows a view of an exemplary tip portion normal to the pressure side wall according to another example, where coolant exits pressure side flow channels through one or more slanted and/or diffusing radial flow outlets, in accordance with one or more aspects of this disclosure.
Figure 5C:
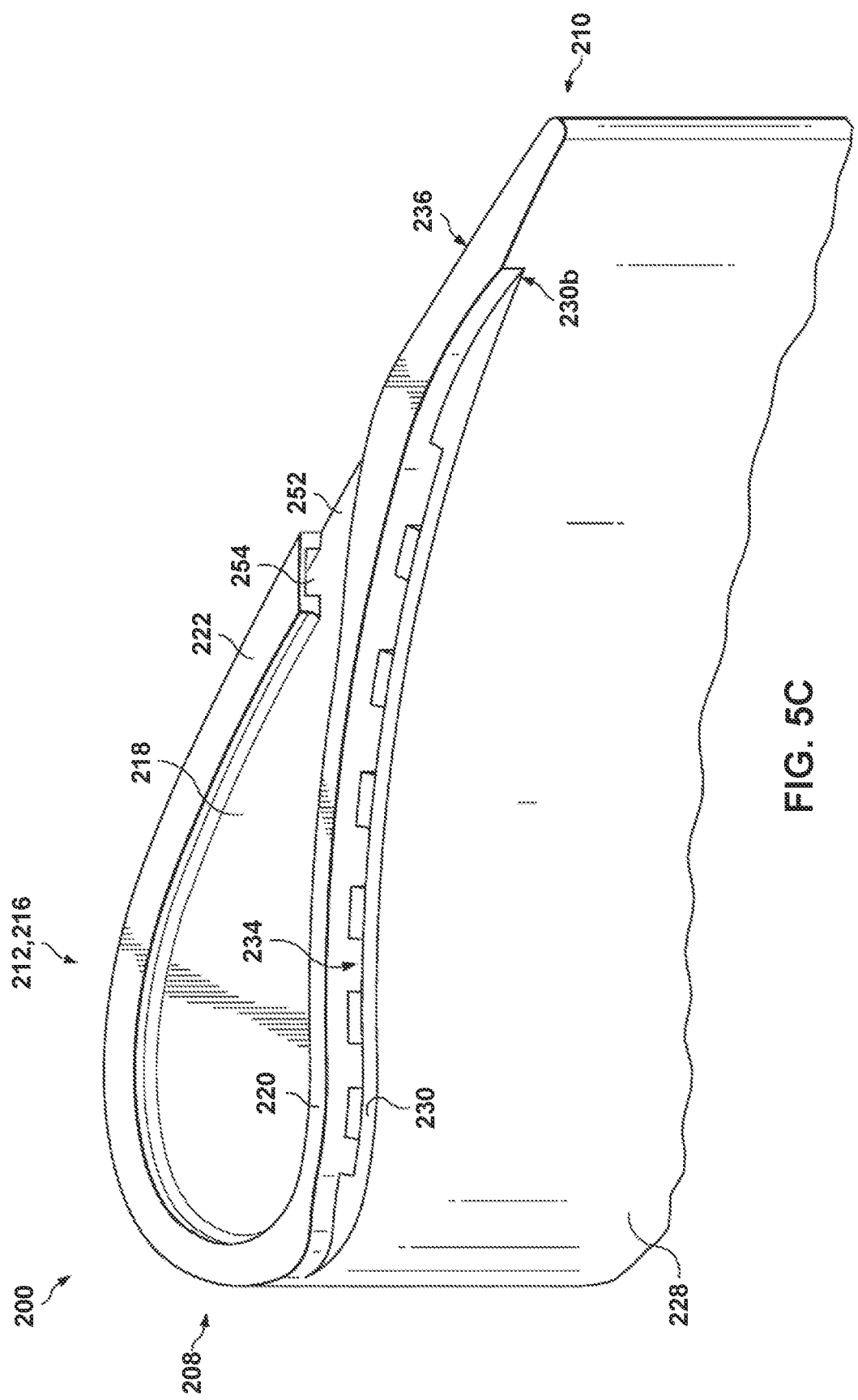
FIG. 5C shows a cut away perspective view of an exemplary tip portion that includes slanted and/or diffusing radial flow outlets as well as a suction side exit slot that directs coolant in a non-radial direction, in accordance with one or more aspects of this disclosure.
Figure 6:
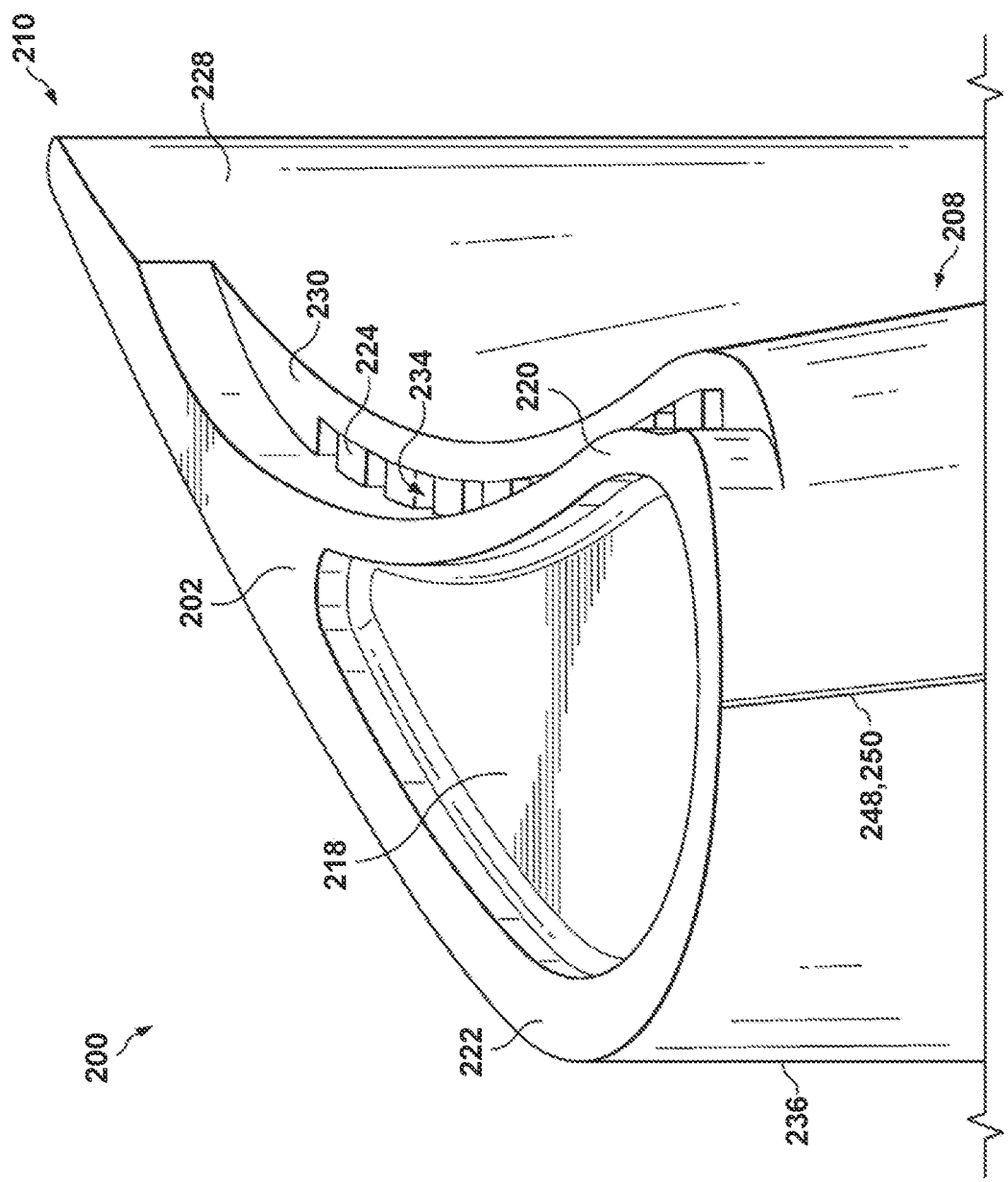
FIG. 6 shows another cut away perspective view of the tip portion of FIG. 2, in accordance with one or more aspects of this disclosure.

As can be seen in FIGS. 3 and 6, the suction side coversheet 236 may extend full-span in the radial direction and terminate at the tip 212 of the spar, thereby forming a dual-wall structure 240 with the suction side rail 222. In such an example, the coolant circuit 238 may be designed to direct the coolant from cooling holes 226 in the suction side wall 206 through one or more exit holes 260 in the suction side coversheet 236 and/or through one or more exit slots at or near the trailing edge 210. The cooling holes 226 in the suction side wall 206 in fluid communication with the coolant cavity 214 may be directed normal to the wall 206 or in an off-normal direction. For example, depending on the depth of the surface cavity 218, one or more of the cooling holes 226 may be slanted within the suction side wall 206 in order to access the portion of the coolant circuit 238 adjacent to the suction side rail 222, as shown in FIG. 3. The flow passing through this portion of the coolant circuit 238 may exit through exit holes 260 in the suction side coversheet 236 and enter the mainstream flow upstream of where it enters the coolant circuit 238 (counter-flow), downstream of where it enters the coolant circuit 138 (co-flow) or radially inward from where it enters the coolant circuit 238. In the co-flow configuration, the coolant may also or alternatively travel to the exit slot(s) at or near the trailing edge 210 to provide cooling. For example, referring again to FIG. 5C, an exemplary exit slot 254 in the suction side rail 222 is shown for a configuration in which there is a break in—or termination point of—the suction side rail 222. The break or termination point in the suction side rail 222 creates a suction side exit 252 from the surface cavity 218 and also provides a location for the exit slot 254. The exit slot 254 directs flow in a chordal direction from the coolant circuit 238 onto the surface cavity 218, promoting cooling of the tip 212,216 and the trailing edge 210. The break or termination point in the suction side rail 222 may be located near the trailing edge 210. Generally speaking, in contrast to the radial flow outlets 234 on the pressure side of the airfoil 200, exit holes or slots on the suction side or at the trailing edge 210 of the airfoil 200 may direct the coolant in a non-radial direction, e.g., in a direction transverse to the radial direction, such as in a chordal direction, and/or in an outward or normal direction (e.g., with respect to the suction side wall 206 of the airfoil 200). Thus, the exit holes or slots on the suction side (e.g., in the suction side rail 222 or suction side coversheet 236) or at the trailing edge 210 of the airfoil 200 may be described as non-radial coolant outlets.

As discussed above, airfoil 200 may include one or more coversheets (e.g., pressure side coversheet 228 and/or suction side coversheet 236). In general, a coversheet may be a relatively thin component (e.g., 0.015-0.080″) and may be formed of metal. Coversheets may have complex 3D profiles and different shapes of coversheet may be used in a single gas-turbine engine. For instance, coversheets for compressor/turbine blades in different stages may have different shapes. Such variation introduces various manufacturing complexities.

In accordance with one or more aspects of this disclosure, a pECM system may machine features into a coversheet (e.g., pressure side coversheet 228 and/or suction side coversheet 236). As one example, pECM system 100 of FIG. 1A may remove material from pressure side coversheet 228 to form radial flow outlets 234. As another example, pECM system 100 of FIG. 1A may remove material from suction side coversheet 236 to form exit holes 260. As another example, pECM system 100 of FIG. 1A may remove material from a coversheet to create a shape of bond and aero side surfaces of the coversheet. While described with respect to machining features into a coversheet, the techniques of this disclosure are not so limited. For instance, pECM system 100 of FIG. 1A may remove material from spar components (e.g., spar 202) to form cooling pattern geometry.

As noted above, enclosure system 114 may mount (e.g., hold) workpiece 120. For instance, enclosure system 114 may include clamps 115A and 115B configured to hold ends of workpiece 120 (e.g., configured to hold ends of a coversheet). As also noted above, during operation of pECM system 100, electrolyte system 104 may circulate electrolyte for distribution to a working surface of machining tool 112. This electrolyte may impact a workpiece 120, thereby imparting a force upon workpiece 120. In some cases, this force may cause workpiece 120 to deflect. For instance, this force may cause span 123 of workpiece 120 (e.g., a portion of workpiece 120 between ends 121A and 121B) to deflect away from machining tool 112. Such deflection of workpiece 120 may adversely impact an accuracy of material removal from workpiece 120. As one example, deflection of suction side coversheet 236 during operation of pECM system 100 may result in finished coversheet surface 236 being inaccurately formed. As another example, deflection of spar 202 during operation of pECM system 100 may result in finished cooling pattern geometry being inaccurately formed in spar 202.

In accordance with examples of the disclosure, pECM system 100 may provide support to workpiece 120 to reduce or eliminate deflection induced by electrolyte spray. For instance, in addition to one or more clamps holding ends of workpiece 120, enclosure system 114 may include backside support 125 configured to support span 123 of workpiece 120. In general, backside support 125 may oppose a force induced by the supply of the electrolyte on workpiece 120. As such, backside support 125 may reduce or eliminate deflection of workpiece 120 away from machining tool 112. In this way, backside support 125 may improve accuracy of pECM system 100.

This disclosure provides several different examples of backside support 125. As one example, backside support 125 may include a reservoir of fluid. As another example, backside support 125 may include a stream of fluid sprayed at a bottom surface of workpiece 120. As another example, backside support 125 may include a plurality of height adjustable pins. As another example backside support 125 may include a block having a surface that matches a surface of workpiece 120. As another example backside support 125 may include a plurality of pedestals connected to workpiece 120 via an adhesive. Further details of these examples are discussed below with reference to FIGS. 7A-7E.

FIGS. 7A-7E are conceptual diagrams illustrating various examples of backside support for a workpiece in a pECM system, in accordance with one or more aspects of this disclosure. As can be seen in FIGS. 7A-7E, workpiece 120 may be a coversheet having a three-dimensional non-working surface 127 (e.g., a surface opposite target surface 126).

Figure 7A:
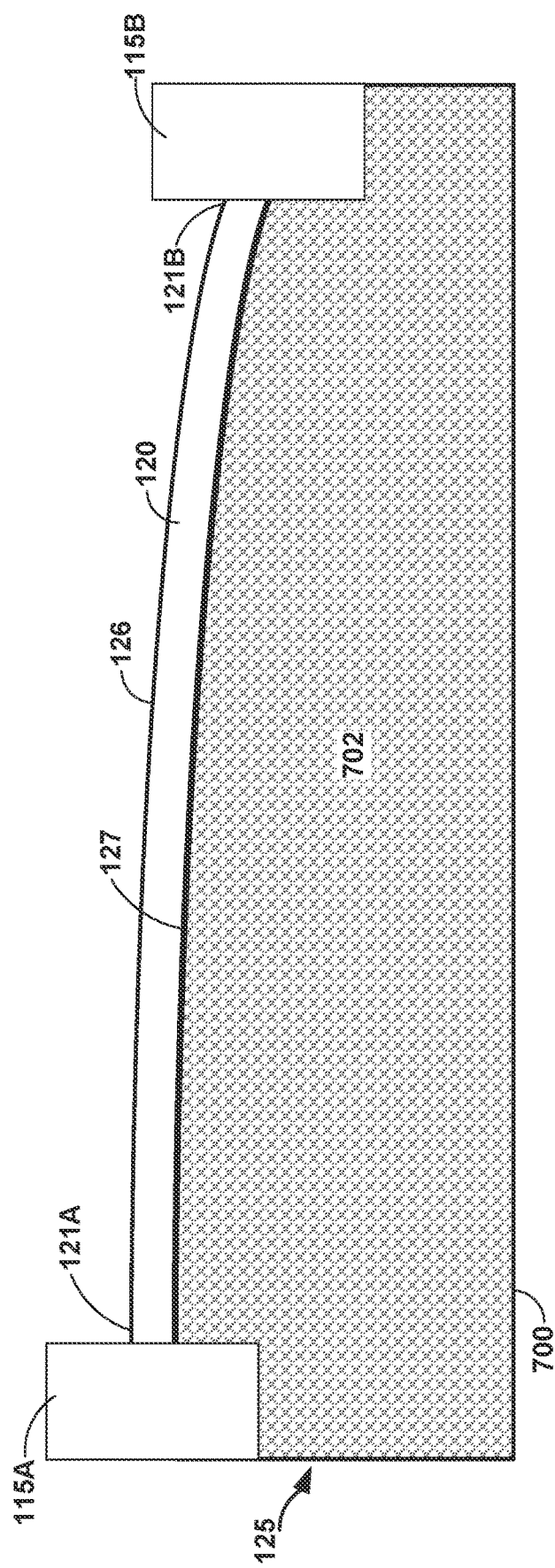

As shown in FIG. 7A, backside support 125 may include reservoir 700, which may be filled with fluid 702. In operation, reservoir 700 may be positioned such that fluid 702 presses against non-working surface 127 of workpiece 120. Fluid 702 may be incompressible (or substantially incompressible) such that deflection of workpiece 120 is reduced or eliminated. In some examples, fluid 702 may be the electrolyte utilized by electrolyte system 104. Using a same fluid as electrolyte system 104 may provide an advantage of fluid 702 not contaminating workpiece 120. In some examples, fluid 702 may be a liquid. In other examples, fluid 702 may be a gas (e.g., a high-pressure gas).

In some examples, reservoir 700 may be a fully sealed container such that fluid 702 does not directly contact non-working surface 127. In such examples, at least a portion of reservoir 700 that contacts non-working surface 127 may be flexible (e.g., such that such portion of reservoir 700 may conform to a profile of non-working surface 127). In some examples, an amount of fluid 700 in reservoir 700 may be adjusted (e.g., to control how much force is imparted by fluid 700 onto non-working surface 127).

In some examples, reservoir 700 may be a non-fully sealed container such that fluid 702 directly contacts non-working surface 127. For instance, reservoir 700 may be a "tub" or other such container. In some examples, an amount of fluid 700 in reservoir 700 may be adjusted (e.g., reservoir 700 may be filled or emptied to a point where fluid 702 contacts non-working surface 127, or at least a threshold amount of working surface 127 (e.g., 50%)).

As shown in FIG. 7B, backside support 125 may include nozzle 704 configured to spray fluid 702 at non-working surface 127 of workpiece 120 (e.g., a surface of workpiece 120 that is opposite target surface 126). As discussed above, fluid 702 may be the electrolyte utilized by electrolyte system 104. In some examples, nozzle 704 may be fluidically connected to electrolyte system 104. A flow rate and/or pressure of fluid 702 supplied to nozzle 704 may be adjusted (e.g., to control how much force is imparted by fluid 700 onto non-working surface 127). In some examples, electrolyte system 104 may adjust the flow rate and/or pressure of fluid 702 supplied to nozzle 704 based on a flow rate and/or pressure of fluid 702 supplied to the interelectrode gap. For instance, electrolyte system 104 may adjust the flow rate and/or pressure of fluid 702 supplied to nozzle 704 such that the force imparted on non-working surface 127 by fluid 702 matches (e.g., is substantially equal an opposite to) a force imparted on target surface 126.

While illustrated in FIG. 7B as including a single nozzle, backside support 125 is not so limited. For instance, backside support 125 may include a plurality of nozzles arranged in a one or two-dimensional array, each of which may be configured to spray fluid 702 at non-working surface 127.

Figure 7C:
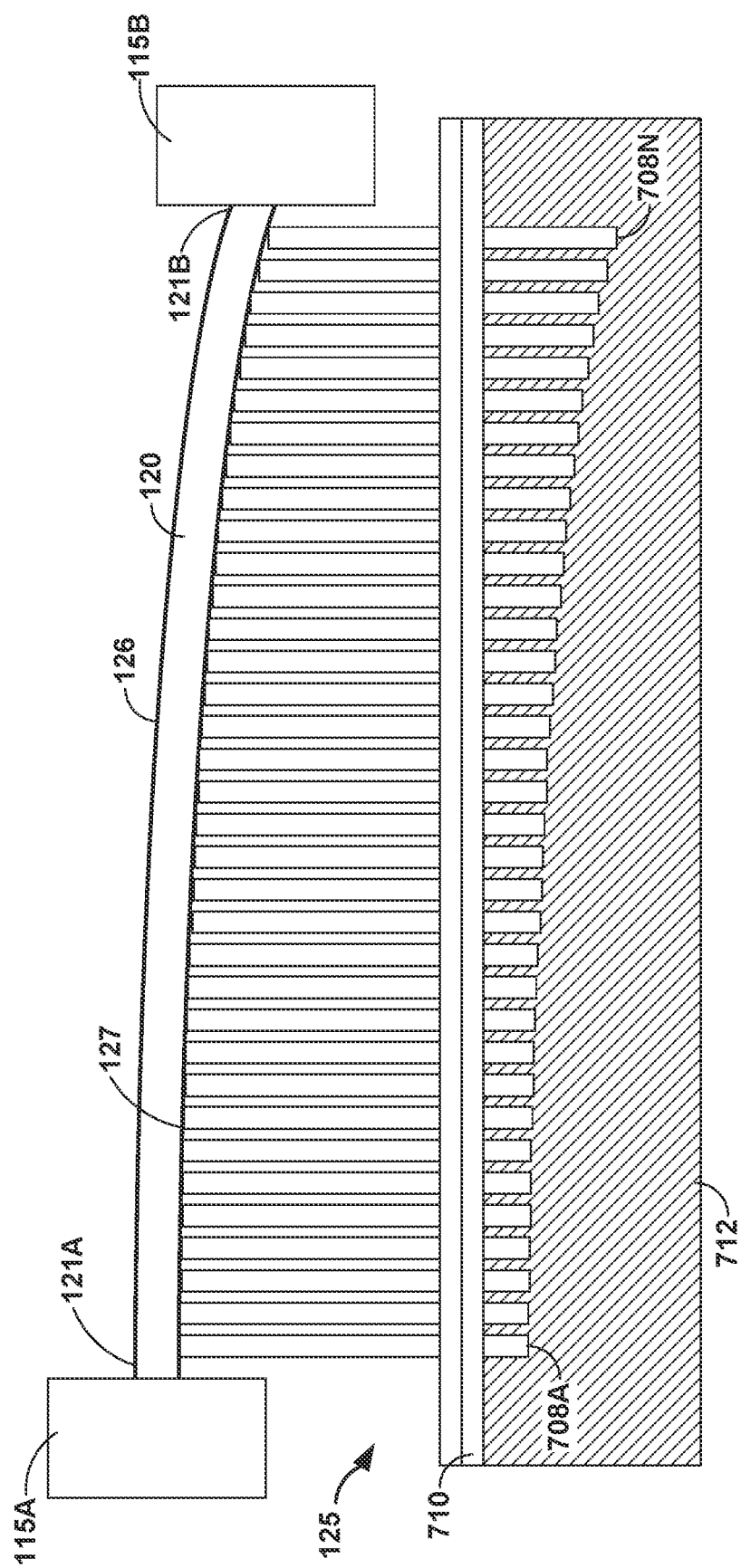

As shown in FIG. 7C, backside support 125 may include a plurality of height adjustable pins 708A-708N (collectively, "pins 708"). In operation, an operator of pECM system 100 may raise pins 708 until pins 708 contact non-working surface 127 of workpiece 120. As non-working surface 127 of workpiece may not be flat (e.g., may have a two or three-dimensional profile), pins 708 may contact non-working surface 127 at different heights. In some examples, backside support 125 may include locking mechanism 710, which may be configured to lock positions of pins 708. Locking mechanism 710 may include plates defining holes through which pins 708 pass. To lock positions of pins 708, one of the plates may be moved (e.g., in a direction perpendicular to longitudinal axes of pins 708) such that the moved and non-moved plates apply a restrictive pressure on pins 708.

In some examples, backside support 125 may include pin raising component 712, which may be configured to press pins 708 against non-working surface 127. As one example, pin raising component 712 may include a reservoir of fluid that displaces pins 708 towards non-working surface 127. As another example, pin raising component 712 may include one or more spring that force pins 708 towards non-working surface 127.

While illustrated in FIG. 7C as including a one-dimensional array of pins 708, backside support 125 is not so limited. For instance, backside support 125 may include a two-dimensional array of pins 708. In any case, pins 708 may be uniformly or non-uniformly distributed. In some examples, such as where pins 708 are non-uniformly distributed, a distribution of pins 708 may be based on a geometry and/or rigidity of workpiece 120. For instance, a density of pins 708 may be increased in less dense areas of workpiece 120 relative to more dense areas.

Figure 7D:
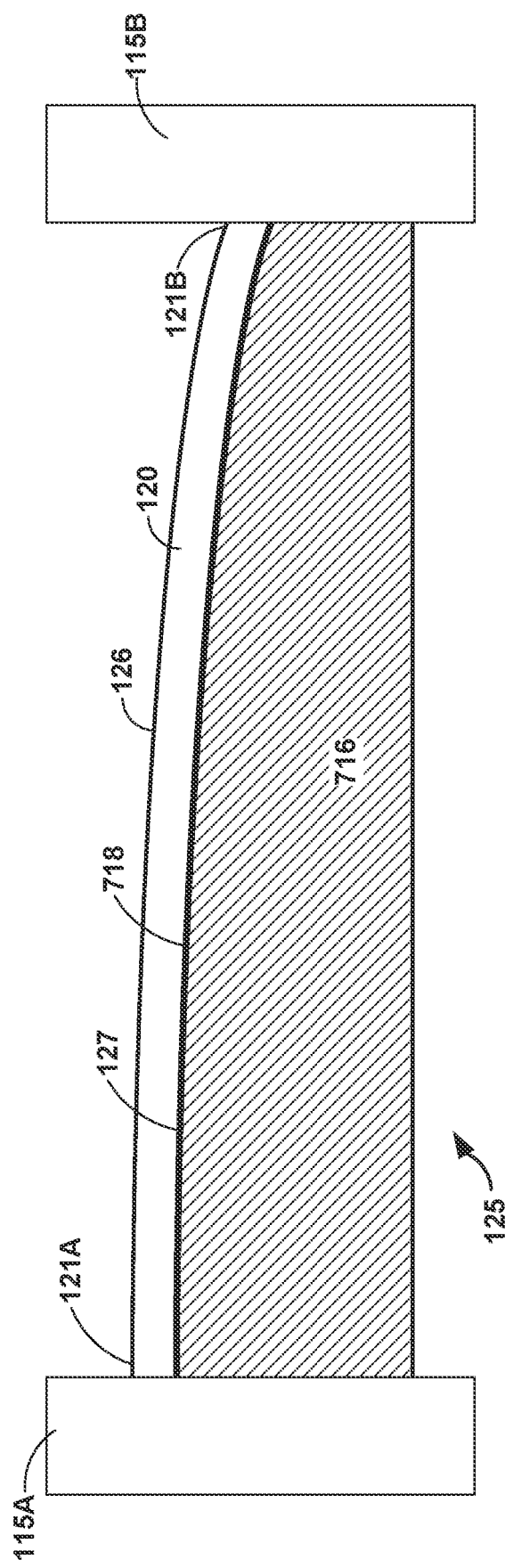

As shown in FIG. 7D, backside support 125 may include block 716 having a surface that matches a surface of workpiece 120. For instance, upper surface 718 of block 716 may have a complimentary (e.g., a negative) profile of non-working surface 127 of workpiece 120. Block 716 may be formed from any suitable material. For instance, block 716 may be formed from solid, corrosion resistant materials such as stainless steels or titanium, or any corrosion resistant metal that has a suitable corrosion resistant coating applied. Other possible materials for block 716 include plastics (e.g., an ABS like material), epoxies, and hardened rubber.

Figure 7E:
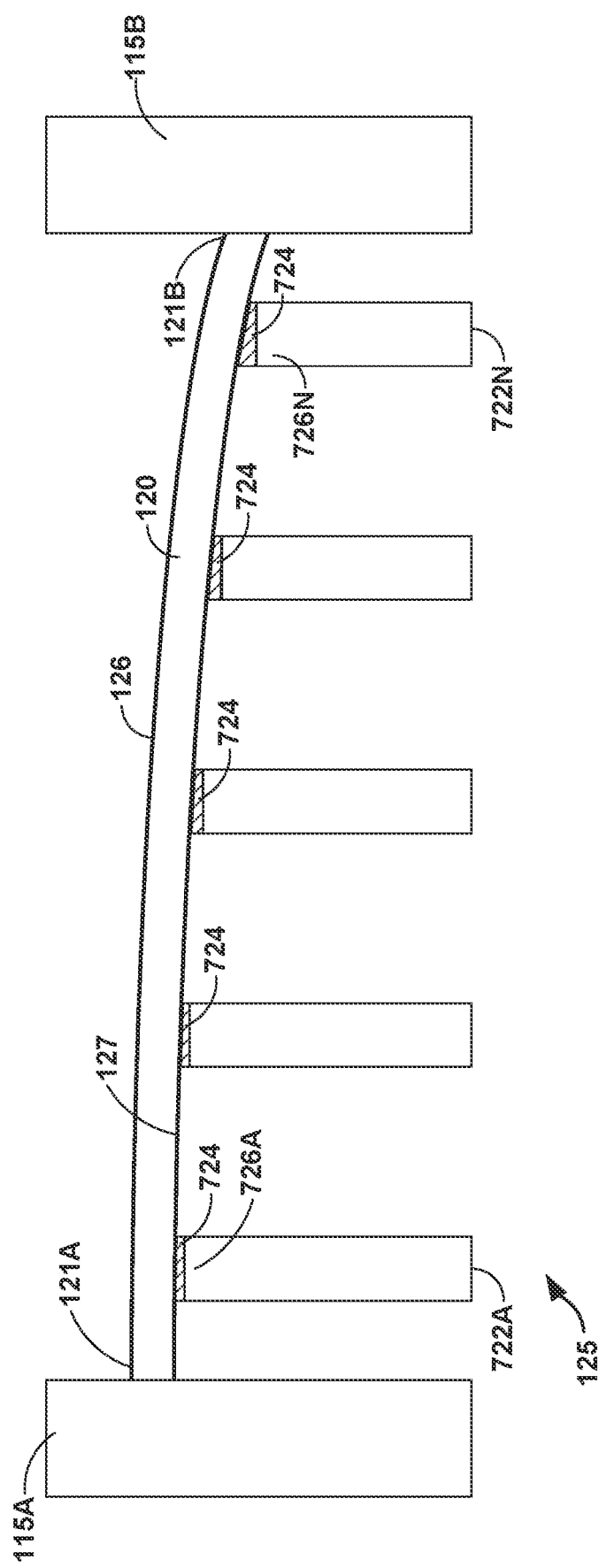

As shown in FIG. 7E, backside support 125 may include a plurality of pedestals 722A-722N (collectively, "pedestals 722") connected to workpiece 120 via an adhesive 724. For instance, pedestals 722 may be positioned such that distal portions 726A-726N (collectively, distal portions 726") of pedestals 722 will be proximal to non-working surface 127 (e.g., via height adjustment and/or various size selection of pedestals 722). Adhesive 724 may be applied to distal portions 726 and non-working surface 127 may be pressed against adhesive 724. Adhesive 724 may be cured (e.g., via ultraviolet (UV) light, heat, or other suitable techniques), thereby adhering workpiece 120 to backside support 125. In some examples, adhesive 724 may include one or more of the curable adhesive available from Blue Photon Technology & Workholding Systems LLC (Shelby, MI USA). With workpiece 120 adhered to backside support 125, pECM system 100 may machine workpiece 120. After machining is complete, adhesive 724 may be removed (e.g., via heat or mechanical force) to separate pedestals 722 from workpiece 120.

In general, pedestals 722 may be rods or other solid structures. As noted above, pedestals 722 may be available in different heights. Alternatively, all of pedestals 722 may be a same height. In some examples, pedestals 722 may define a hollow channel through which a UV emitting element may be passed (e.g., to cure adhesive 724).

In some examples, backside support 125 may be electrically conductive. For instance, backside support 125 may form a portion of a current path that electrically couples workpiece 120 to power supply 106. As one specific example, adhesive 724 may be an electrically conductive adhesive (e.g., and pedestals 722 may be electrically conductive).

While the examples of FIGS. 7A-7E are shown as including clamps 115A and 115B, this disclosure is not so limited. For instance, enclosure system 114 may omit one of both of clamps 115A and/or 115B at least where backside support 125 includes pedestals 722 connected to workpiece 120 via adhesive 724. The ability to omit one of both of clamps 115A and/or 115B may be advantageous when workpiece 120 is an endwall coversheet (e.g., a coversheet where machining is performed across a majority of target surface 126 such that there may not be space for clamps 115A and/or 115B.

As described above, workpiece 120 may include target surface 126 and non-working surface 127. It is understood that the identification of target surface 126 and non-working surface 127 may change. For instance, a particular workpiece may be flipped over, there by reversing which surface is the target surface and the non-working surface.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A pulsed electrochemical machining (pECM) system, comprising:
   a pECM tool comprising a tool body defining a tool axis, the tool body comprising one or more electrodes, each of the one or more electrodes comprising an electrically conductive material and defining a working surface at a distal end of the tool axis configured to face a working surface of a workpiece;
   a pulsing power supply configured to output pulses of electrical energy via the one or more electrodes;
   an enclosure system configured to hold the workpiece, wherein the enclosure system comprises:
   a first clamp configured to grip a first end of the workpiece;
   a second clamp configured to grip a second end of the workpiece; and
   a backside support in physical contact with and configured to support a span of a non-working surface of the workpiece between the first end and the second end, wherein the backside support comprises:
   a plurality of height adjustable pins that each support a portion of the span.

2. The pECM system of claim 1, wherein the workpiece comprises a coversheet for an airfoil of a gas-turbine engine.

3. The pECM system of claim 2, further comprising:
   an electrolyte system configured to supply electrolyte to an interelectrode gap between the working surface of the one or more electrodes and a target surface of the workpiece, wherein a force induced by the supply of the electrolyte on the workpiece is opposed in part by the backside support.

4. The pECM system of claim 3, wherein the backside support supports at least a portion of the span that is opposite a portion of the target surface that is being machined by the pECM tool.

5. The pECM system of claim 3, wherein the backside support comprises:
   a reservoir of fluid.

6. The pECM system of claim 5, wherein the fluid comprises the electrolyte.

7. The pECM system of claim 1, wherein the plurality of height adjustable pins are uniformly distributed.

8. The pECM system of claim 1, further comprising:
   a locking mechanism configured to lock positions of the plurality of height adjustable pins.

9. The pECM system of claim 1, wherein the backside support comprises:
   a block having a surface that corresponds to a surface of the workpiece that is opposite a target surface of the workpiece.

10. A method for pulsed electrochemical machining (pECM) a workpiece, comprising:
    gripping a first end of the workpiece having a target surface and a non-target surface;
    gripping a second end of the workpiece;
    supporting, by a backside support, a span of the workpiece that extends between the first end and the second end, wherein the backside support is in physical contact with the non-target surface of the workpiece;
    generating a pulsed direct current between one or more electrodes of a machining tool and the workpiece, wherein the machining tool comprises a tool body defining a tool axis, the tool body comprising the one or more electrodes, each of the one or more electrodes comprising an electrically conductive material and defining a working surface at a distal end of the tool axis configured to face the workpiece, wherein the backside support comprises a plurality of height adjustable pins that each support a portion of the span;
    delivering an electrolyte into an interelectrode gap between the working surface of the one or more electrodes and the target surface of the workpiece; and
    positioning the working surface of the one or more electrodes relative to the target surface of the workpiece to remove material from the target surface of the workpiece.

11. The method of claim 10, wherein the workpiece comprises a coversheet for an airfoil of a gas-turbine engine.

12. The method of claim 10, wherein supporting the span of the workpiece comprises opposing a force induced by the delivery of the electrolyte on the workpiece.

13. The pECM system of claim 1, wherein the system is not configured to machine, temporally in parallel, the working surface and the non-working surface.

14. The pECM system of claim 1, wherein the backside support forms a portion of a current path that electrically couples the workpiece to the power supply.

15. The method of claim 10, further comprising:
    flipping, after removing material from the target surface of the workpiece, the workpiece over to remove material from the backside of the workpiece via the machining tool.

16. A pulsed electrochemical machining (pECM) system, comprising:
    a pECM tool comprising a tool body defining a tool axis, the tool body comprising one or more electrodes, each of the one or more electrodes comprising an electrically conductive material and defining a working surface at a distal end of the tool axis configured to face a working surface of a workpiece;
    an enclosure system configured to hold the workpiece, wherein the enclosure system comprises:
    a first clamp configured to grip a first end of the workpiece;

a second clamp configured to grip a second end of the workpiece; and a backside support in physical contact with and configured to support a span of a non-working surface of the workpiece between the first end and the second end, wherein the backside support comprises a plurality of pedestals connected to the workpiece via an adhesive.

17. The pECM system of claim 16, wherein the adhesive comprises an ultraviolet (UV) curable adhesive.

18. The pECM system of claim 16, wherein the adhesive is electrically conductive.

19. The pECM system of claim 18, further comprising:
a power supply, wherein the adhesive forms a portion of a current path that electrically couples the workpiece to the power supply.

* * * * *